(12) United States Patent
Ramesh et al.

(10) Patent No.: US 7,041,777 B2
(45) Date of Patent: *May 9, 2006

(54) COATING COMPOSITION USING A POLYESTER RESIN COMPOSITION FOR FORMING A PAINT FILM ON A SUBSTRATE

(75) Inventors: Swaminathan Ramesh, Canton, MI (US); Marvin L. Green, Brighton, MI (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/844,629

(22) Filed: May 13, 2004

(65) Prior Publication Data

US 2005/0182232 A1    Aug. 18, 2005

Related U.S. Application Data

(63) Continuation-in-part of application No. 10/777,698, filed on Feb. 12, 2004.

(51) Int. Cl.
*C08G 63/02* (2006.01)

(52) U.S. Cl. .................. 528/272; 428/411.1; 428/400; 428/426; 428/447; 528/271

(58) Field of Classification Search ............. 428/411.1, 428/400, 426, 447; 528/271, 272
See application file for complete search history.

(56) References Cited

U.S. PATENT DOCUMENTS

| | | | |
|---|---|---|---|
| 6,294,619 B1 * | 9/2001 | Chasser et al. | 525/440 |
| 6,319,311 B1 * | 11/2001 | Katz et al. | 106/287.11 |
| 6,375,789 B1 | 4/2002 | Katz et al. | |
| 6,437,071 B1 | 8/2002 | Odaka et al. | |
| 6,451,930 B1 | 9/2002 | Burgmann et al. | |
| 6,602,964 B1 | 8/2003 | Huang et al. | |
| 2004/0235997 A1 * | 11/2004 | Meisenburg et al. | 524/431 |

* cited by examiner

*Primary Examiner*—Terressa Boykin

(57) ABSTRACT

A coating composition for producing films having improved scratch and mar characteristics. The coating composition incorporates a polyester polycarbamate resin composition, a first cross-linking agent, and a cross-linkable resin to form the film. The resin composition is the reaction product of a first compound having a plurality of hydroxyl groups with a carbamate compound reactive with the hydroxyl groups of the first compound and added in an amount sufficient to form a carbamated intermediary. The carbamated intermediary has at least one primary carbamate group available for cross-linking and has unreacted hydroxyl groups. Then, a silyl compound having a terminal isocyanate group is reacted with the unreacted hydroxyl groups of the carbamated intermediary. The silyl compound also has silylalkoxy groups available for secondary cross-linking. The first cross-linking agent and the cross-linkable resin react with the primary carbamate groups and the silylalkoxy groups, respectively, to produce the film having improved scratch and mar characteristics.

41 Claims, No Drawings

COATING COMPOSITION USING A POLYESTER RESIN COMPOSITION FOR FORMING A PAINT FILM ON A SUBSTRATE

RELATED APPLICATIONS

The present application is a continuation-in-part of co-pending U.S. patent application Ser. No. 10/777,698, filed on Feb. 12, 2004.

FIELD OF THE INVENTION

The subject invention generally relates to a coating composition using a polyester resin composition to produce a paint film having improved scratch and mar characteristics. More specifically, the subject invention relates to coating composition using a polyester resin composition having increased cross-linking capability for use in a clear coat and a method of preparing the same.

BACKGROUND OF THE INVENTION

Coating compositions typically include a resin composition, a cross-linking agent, and other coating additives such as solvents, flow and appearance control agents, fillers such as extender pigment, and the like. In both the refinish and original equipment manufacturer (OEM) coating industries, coating compositions are applied to a substrate, such as an automobile body panel, to produce a paint film on the substrate. Such paint films serve both functional and aesthetic purposes.

These coating compositions are typically based on known resin compositions, such as conventional polyester, polyurethane, and acrylic resin compositions. One specialized resin composition useful in these coating compositions includes a silyl compound and a carbamate compound. Typically, this specialized resin composition includes a first compound having a plurality of hydroxyl groups and a silane carbamate compound. However, none of related art resin compositions include a first compound having carbamate functionality and silyl functionality separate from the carbamate functionality. Therefore, these resin composition do not have secondary groups available for supplemental cross-linking. Another of these specialized resin compositions includes a polyester polymer having a carbamate group and an oxyalkylsilyl monomer containing a silyl group. The carbamate groups are not primary and are not available for cross-linking. Additionally, the oxyalkylsilyl monomer does not include any terminal isocyanate groups available for cross-linking. Therefore, this resin composition does not have the capability of increased cross-linking.

Accordingly, it would be advantageous to provide a coating composition that includes a resin composition having increased cross-linking capability. The increased cross-linking capability of the resin composition allows for reaction with various cross-linking agents, which when applied to a substrate produces a film having improved physical properties.

SUMMARY OF THE INVENTION

A coating composition that exhibits improved scratch and mar characteristics is disclosed. The coating composition of the subject invention includes a polyester resin composition that is the reaction product of a first compound, a carbamate compound, and a silyl compound. The first compound has a plurality of hydroxyl groups and the carbamate compound is reactive with the hydroxyl groups of the first compound. Further, the carbamate compound is added in an amount sufficient to form a carbamated intermediary. The carbamated intermediary has at least one primary carbamate group that is available for cross-linking and also has unreacted hydroxyl groups. The silyl compound, which has a terminal isocyanate group, reacts with the unreacted hydroxyl groups of the carbamated intermediary to form the resin composition. The silyl compound also includes silylalkoxy groups which, after the terminal isocyanate group has reacted with the unreacted hydroxyl groups, are available for secondary cross-linking. The coating composition also includes a first cross-linking agent that is reactive with at least one of the primary carbamate group and the silylalkoxy group.

The general object of the subject invention is to establish a coating composition that includes the polyester resin composition described above to produce films that have improved scratch and mar characteristics. Without intending to be bound by theory, it is believed that the improved results are obtained because the resin composition has an increased cross-linking capability due to the carbamate groups from the carbamated polyester and due to the silylalkoxy groups from the silyl compound. The primary carbamate group is available for cross-linking and the silylalkoxy groups are available for secondary cross-linking. It is this cross-linking which provides the improved scratch and mar characteristics in the films of the coating composition. Further, the silyl compound reduces the viscosity and surface tension of the resin composition, while also using less solvent. This effectively reduces the viscosity of the coating composition for ideal application conditions.

DETAILED DESCRIPTION OF THE INVENTION

The subject invention provides a coating composition using a polyester resin composition having increased cross-linking capability reacted with a first cross-linking agent. The resin composition has increased cross-linking capability, which when applied to a substrate as a film and reacted with a cross-linker has improved scratch and mar characteristics. Without intending to be bound by theory, it is believed that these improved results are obtained because the resin composition has an increased cross-linking capability. In the subject invention, terminal carbamate groups are available for cross-linking and a plurality of silylalkoxy groups are available for secondary cross-linking. It is this cross-linking which provides the improved scratch and mar characteristics of the film.

The resin composition of the subject invention, a polyester polycarbamate, is, also referred to in the art as a star polyester polymer. The resin composition includes a branched organic structure having various functionalities including, but not limited to, branched hydrocarbon functionality, hydroxyl functionality, carboxylate functionality, carbamate functionality, and ester functionality.

In a first embodiment, the resin composition is generally the reaction product of a first compound having a plurality of hydroxyl groups, a primary carbamate compound, and a silyl compound having a terminal group reactive with hydroxyl groups and also having silylalkoxy groups. In a second embodiment, the resin composition is more specifically the reaction product of the first compound having the plurality of hydroxyl groups, a carboxylic acid anhydride, a second compound having at least one epoxy group, the carbamate compound, and the silyl compound having the terminal group reactive with hydroxyl groups and having silylalkoxy groups. In both embodiments, the first compound is a branched compound having a plurality of hydroxyl groups, however, the first compound may remain unreacted or reacted prior to carbamation, as will be described more below.

In the first embodiment, the method of preparing the resin composition includes the steps of providing the branched compound having the plurality of hydroxyl groups and reacting the hydroxyl groups of the branched compound with the carbamate compound to form a carbamated intermediary. The carbamated intermediary has at least one primary carbamate group that is available for cross-linking and has unreacted hydroxyl groups. The primary carbamate group results from the reaction of the carbamate compound with the first compound. The unreacted hydroxyl group results from the plurality of hydroxyl groups of the first compound. The unreacted hydroxyl groups are then reacted with the terminal group of the silyl compound, which is preferably a terminal isocyanate group. This allows the silylalkoxy groups of the silyl compound to be available for secondary cross-linking. The method steps of the first embodiment are preferably conducted at temperatures between 50° C. and 200° C., more preferably between 100° C. and 175° C. This method will be described in further detail below.

In the second embodiment, the method of preparing the resin composition includes the steps of providing the branched compound having the plurality of hydroxyl groups, reacting the hydroxyl groups of the branched compound with the carboxylic acid anhydride to form a first intermediate compound having a plurality of carboxylic acid groups and unreacted hydroxyl groups, and then reacting at least one of the carboxylic acid groups of the first intermediate compound with the epoxy group of the second compound to form a second intermediate compound having at least one hydroxyl group. The at least one hydroxyl group of the second intermediate compound is then reacted with the carbamate compound, which results in the primary carbamate groups, which are for cross-linking. Next, all of the unreacted hydroxyl groups of the carbamated intermediary are reacted with the terminal isocyanate group of the silyl compound to prepare the resin composition. The silyl compound includes silylalkoxy groups for secondary cross-linking. Like the first embodiment, the method steps for the second embodiment are preferably conducted at temperatures between 50° C. and 200° C., more preferably between 100° C. and 175° C. This method will be described in further detail below.

To prepare the polyester resin composition, the first compound is selected to maximize the number of hydroxyl groups, i.e., the hydroxyl functionality, in the first compound while establishing a foundation for the branched organic structure of the resin composition. As such, the first compound may alternatively be described as a branched compound having a plurality of hydroxyl groups. The hydroxyl groups of the first compound can be primary, secondary, and tertiary hydroxyl groups. Preferably, the first compound is present in the resin composition in an amount from 1 to 50, more preferably from 10 to 30, parts by weight based on 100 parts by weight of the resin composition.

The first compound is more specifically selected from the group consisting of erythritol, pentaerythritol, dipentaerythritol, glycerol, trimethylolethane, trimethylolpropane, dulcitol, threitol, and combinations thereof. As understood by those skilled in the art, trimethylolethane and trimethylolpropane each provide three hydroxyl groups, erythritol, pentaerythritol and threitol each provide four hydroxyl groups, and dipentaerythritol and dulcitol each provide six hydroxyl groups. In the preferred embodiment of the subject invention, the first compound comprises pentaerythritol. For descriptive purposes, a chemical representation of pentaerythritol is disclosed below.

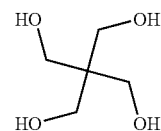

As shown above, pentaerythritol is a compound having a central carbon atom and four peripheral carbon atoms each providing a hydroxyl group for a total of four hydroxyl groups. In view of the above characteristics of the first compound, other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound.

Next, in the first embodiment, the carbamate compound is added to the first compound. The carbamate compound is further defined as an alkyl carbamate having 1 to 20 carbon atoms in the alkyl chain. For example, the carbamate compound may be generically defined as

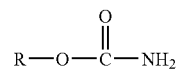

where R is an alkyl chain having from 1 to 20 carbon atoms. Preferably, the carbamate compound is selected from the group consisting of methyl carbamate, ethyl carbamate, and combinations thereof. The most preferred carbamate compound comprises methyl carbamate [$CH_3OC(O)NH_2$]. Other carbamate compounds include, but are not limited to, butyl carbamate, propylene glycol monocarbamate, and the like.

The carbamate compound is present in the resin composition in an amount from 5 to 65, preferably from 20 to 60, parts by weight based on 100 parts by weight of the resin composition. The carbamate compound is added in an amount sufficient to form a carbamated intermediary having unreacted hydroxyl groups. This trans-carbamation is effected by use of a tin catalyst like dibutyltin oxide (DBTO) and removing the alcohol byproduct that is formed. It is preferred that the first compound is carbamated to at least 75%, i.e., that three out of the four available hydroxyl groups have been reacted and therefore the carbamated intermediary has at least one unreacted hydroxyl groups. It is to be appreciated that in a mixture, there will be certain molecules that may have achieved 100% carbamation, while others will only be at 25% or less. Therefore, the 75% carbamation refers to the mixture, so long as there remain unreacted hydroxyl groups. Those skilled in the art recognize that the amount of carbamation can be determined by either titration to determine the hydroxyl number or by monitoring the amount of methanol by-product produced from the reaction. A theoretical amount of methanol by-product can be calculated for 75% carbamation and once that amount is reached, the reaction will have reached the desired carbamation.

As indicated above, the number of hydroxyl groups in the first compound functions as a foundation for the branched organic structure of the resin composition. In the preferred embodiment, the molar ratio of the carbamate compound, methyl carbamate, to the first compound, pentaerythritol, is 3:1. If the first compound is dipentaerythritol having six hydroxyl groups, then preferably five moles of the carbamate compound are utilized to prepare the completed resin composition. Of course, structures resulting from lower equivalents of the carbamate compound are not to be excluded, so long as there are plurality of carbamate groups and at least one hydroxyl group available for subsequent reaction with the silyl compound. A chemical representation of the carbamated intermediary of the first embodiment, wherein the first compound is pentaerythritol and the carbamate compound is methyl carbamate, is disclosed below.

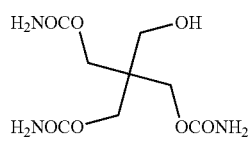

The carbamated intermediary is then reacted with a silyl compound having the terminal group. The terminal group is preferably an isocyanate group, however, other groups may be used that are reactive with hydroxyl groups. The terminal group should be more reactive than the silylalkoxy groups with the hydroxyl groups to ensure that the silylalkoxy groups are intact at the end of the reaction. Preferably, the silyl compound is an isocyanatoalkylalkoxysilane and is more preferably selected from the group consisting of isocyanatopropyltrimethoxysilane, isocyanatopropyl-methyldimethoxysilane, isocyanatopropylmethyldiethoxysilane, isocyanatepropyl-triethoxysilane, isocyanatoneohexyltrimethoxysilane, isocyanate-neohexyldimethoxysilane, isocyanatoneohexydiethoxysilane, isocyanatoneohexyltriethoxysilane, isocyanatoisoamyltrimethoxysilane, isocyanatoisoamyldimethoxysilane, isocyanatoisoamylmethyldiethoxysilane, isocyanatoisoamyltriethoxysilane, and combinations thereof. One example of the silyl compound is commercially available from Crompton Corp. as SILQUEST® A-Link 25 or SILQUEST® A-Link 35. It is believed that the terminal isocyanate component of the silyl compound reacts with the unreacted hydroxyl groups of the carbamated intermediary, because the hydroxyl groups are much more reactive than the carbamate groups toward the isocyanate. However, it is to be appreciated that in the mixture, and under particular reaction circumstances, while not preferred, the isocyanate groups may react with the carbamate groups. The reaction of the silylalkoxy groups with the hydroxyl group may occur but the experimental conditions were chosen such that the isocyanate group will react with the hydroxyl groups more readily over that of silylalkoxy reaction with the hydroxyls. The silyl compound also reduces the viscosity and surface tension of the resin composition, while also allowing for a higher solids content to be obtained for the resin composition. Reduced viscosity of the resin composition means that less solvent is required to lower an application viscosity of a coating composition that incorporates the resin composition and this is, therefore, more environmentally friendly.

The silyl compound is present in the resin composition in an amount from 1 to 70, preferably from 15 to 50, parts by weight based on 100 parts by weight of the resin composition. A chemical representation of the resin composition of the first embodiment is disclosed below where the silyl compound is isocyanatopropyltrimethoxysilane.

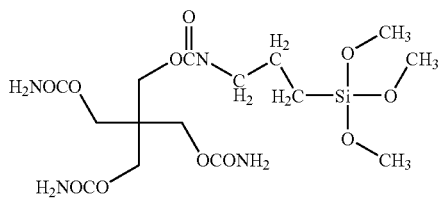

In the second embodiment, the first compound is first reacted with the carboxylic acid anhydride prior to adding the carbamate compound. The carboxylic acid anhydride may be either an aromatic or non-aromatic cyclic anhydride. The carboxylic acid anhydride is preferably selected from, but not limited to, the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and combinations thereof. In the preferred embodiment of the subject invention, the carboxylic acid anhydride comprises hexahydrophthalic anhydride. For descriptive purposes, a chemical representation of hexahydrophthalic anhydride is disclosed below.

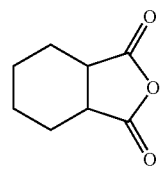

As shown above, the hexahydrophthalic anhydride provides an acid functionality whereby one carboxylic acid group can be formed into the intermediate compound per mole of the carboxylic acid anhydride introduced.

The carboxylic acid anhydride is present in the resin composition in an amount from 10 to 40, preferably from 23 to 37, parts by weight based on 100 parts by weight of the resin composition. More specifically, in the preferred embodiment, the molar ratio of the carboxylic acid anhydride, hexahydrophthalic anhydride, that is reacted with the first compound, pentaerythritol, is 3:1. That is, three moles of hexahydrophthalic anhydride are reacted with one mole of pentaerythritol to form the first intermediate compound. For descriptive purposes, a chemical representation of the first intermediate compound formed by the reaction of one mole pentaerythritol and three moles of hexahydrophthalic anhydride according to the second embodiment is disclosed below.

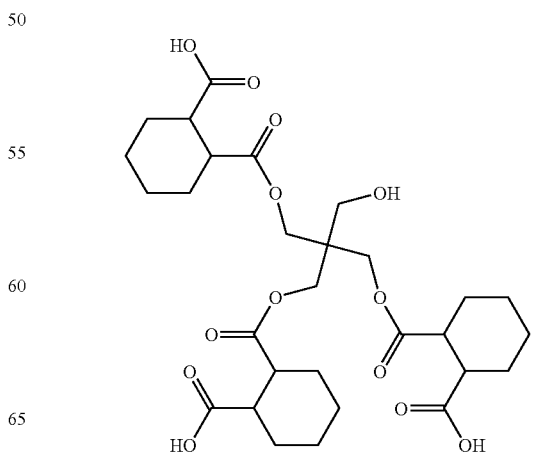

As shown above, the first intermediate compound that is formed with the reactants of the preferred embodiment is a tricarboxylic acid compound, i.e., a compound including three carboxylic acid groups or an acid functionality of three. These three carboxylic acid groups of the first intermediate compound are formed when the anhydride rings of the three moles of hexahydrophthalic anhydride open forming ester linkages with the pentaerythritol, and the hydrogen atoms from the three hydroxyl groups of the pentaerythritol react with the oxygen atoms originally from the anhydride rings of the three moles of hexahydrophthalic anhydride thereby forming the tricarboxylic acid intermediate compound according to the preferred embodiment. As stated above, the intermediate compound of the preferred embodiment has an acid functionality of three. Of course, it is to be understood that the acid functionality can decrease or increase depending upon the selection of the particular first compound and of the particular carboxylic acid anhydride, and upon the equivalent weight ratios between the first compound and the carboxylic anhydride. It is preferred to have unreacted hydroxyl groups remaining from the first compound for reacting with the silyl compound to increase the cross-linking capability of the compound and reduce the equivalent weight of the resin.

The chemical representation of the first intermediate compound disclosed above is merely illustrative of the subject invention. The intermediate compound disclosed above has a four-branch organic structure originally derived from the organic structure of the pentaerythritol. It is to be understood that if an alternative first compound is selected, such as dipentaerythritol which, as discussed above, provides six hydroxyl groups, then the intermediate compound would have a six-branch organic structure derived from the structure of the dipentaerythritol. Of course, five moles of hexahydrophthalic anhydride then may be selected to react with five of the six hydroxyl groups of the dipentaerythritol.

Continuing with the preparation of the resin composition according to the second embodiment, at least one of the carboxylic acid groups of the first intermediate compound is reacted with the second compound to form the second intermediate compound having the at least one hydroxyl group. More specifically, it is the epoxy group of the second compound that reacts with at least one of the carboxylic acid groups of the first intermediate compound to form the second intermediate compound having the at least one hydroxyl group. Preferably, all of the carboxylic acid groups of the first intermediate compound are reacted with the second compound such that the second intermediate compound is formed with a plurality of hydroxyl groups.

The second compound is selected to include at least one epoxy group, and is present in the resin composition in an amount from 20 to 70, preferably from 30 to 60, parts by weight based on 100 parts by weight of the resin composition. The second compound is further selected to include from 6 to 20, preferably from 10 to 15, carbon atoms. As such, the second compound is selected from the group consisting of glycidylneodecanoate, dodecyl oxide, tetradecyl oxide, octadecyl oxide, and cyclohexene oxide, and combinations thereof. In view of the above characteristics of the second compound, other equivalent compounds include, but are not limited to, epoxy-containing aromatic hydrocarbons such as bisphenol A monoglycidyl ether.

In the preferred embodiment of the subject invention, the second compound comprises glycidylneodecanoate. As is known in the art, glycidylneodecanoate is commercially available from Miller-Stephenson Chemical Company, Inc. under its CARDURA® product line, as CARDURA E 10P.

For descriptive purposes, a chemical representation of glycidylneodecanoate is disclosed below.

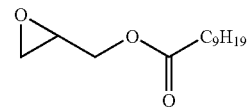

As shown above, glycidylneodecanoate includes one epoxy group. Preferably, three moles of glycidylneodecanoate are reacted with the three carboxylic acid groups of the first intermediate compound such that one epoxy group reacts with each carboxylic acid group. As described above, it is the epoxy group of the second compound that reacts with at least one of the carboxylic acid groups of the first intermediate compound. More specifically, the epoxy ring of the glycidylneodecanoate opens such that one of the two carbon atoms, originally in the epoxy ring of the glycidylneodecanoate, reacts and bonds with an oxygen atom from one of the hydroxyls of the carboxylic acid groups of the first intermediate compound. It is to be understood by those skilled in the art that in the reaction, the epoxy ring can open in one of two manners such that either one of the carbon atoms of the epoxy ring reacts and bonds with the oxygen atom from the hydroxyl of the carboxylic acid group. The resultant second intermediate compound includes either a primary hydroxyl or a secondary hydroxyl. For simplicity, only the second intermediate compound with primary hydroxyl groups is disclosed, but it is to be appreciated that one skilled in the art would recognize the second intermediate compound with secondary hydroxyl groups.

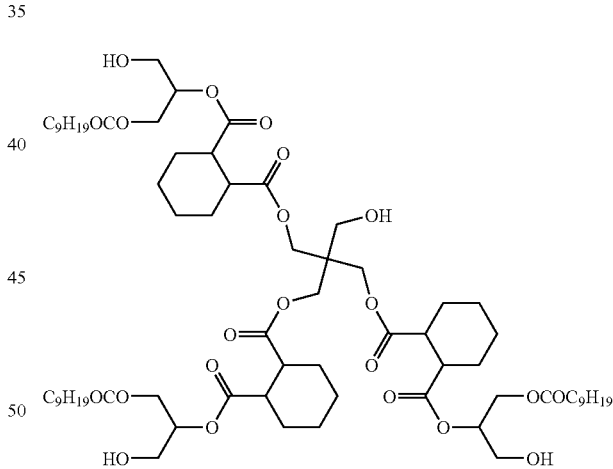

Next, in the second embodiment, the hydroxyl groups of the second intermediate compound are reacted with the carbamate compound in amounts sufficient to carbamate the second intermediate compound, as described above. Those skilled in the art will appreciate that in the mixture some of the unreacted hydroxyls may react with the carbamate compound. A chemical representation of the carbamated intermediary of the second embodiment is disclosed below, wherein only the primary hydroxyls from the reaction of carboxylic acids with the epoxide are transcrabamated. However, those skilled in the art will recognize that one cannot distinguish between these and the unsubstituted primary hydroxyl from the starting first compound. Also, some of the secondary hydroxyls present will also be transcarbamated, even though kinetically these are expected to be slower.

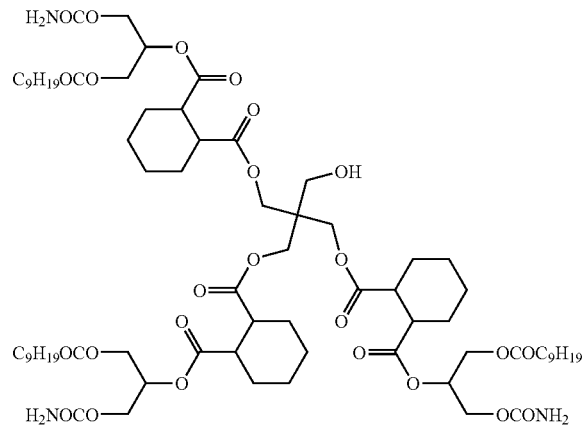

As shown above in the carbamated intermediary, the carbamate compound, methyl carbamate, has reacted with the primary hydroxyls of the second intermediate compound that result from the particular manner of epoxy ring opening of the glycidylneodecanoate. As such, primary carbamate groups are present. Of course, in terms of the second embodiment, during the three moles of methyl carbamate react with the hydroxyl groups of the second intermediate compound (catalyzed by Tin compounds) to prepare the resin composition, three moles of methanol are produced as a side product. The number of moles of alcohol that are produced as a side product vary depending on the number of moles of the carbamate compound, preferably the methyl carbamate, that are reacted with the second intermediate compound. It is to be appreciated that the carbamate compound can also react with the secondary hydroxyls of the second intermediate compound that result from a second manner of epoxy ring opening of the glycidylneodecanoate, if present.

Next, the carbamated intermediary is then reacted with the silyl compound having the terminal isocyanate group, as described above. A chemical representation of the resin composition of the second embodiment is disclosed below where the silyl compound is isocyanatopropyltriethoxysilane.

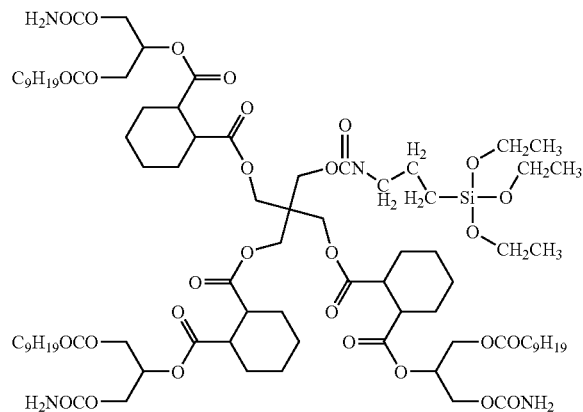

As shown above in either of the embodiments, the resin composition is a polyester polycarbamate, preferably a polyester tricarbamate, having a four-branch organic structure.

The resin composition of the subject invention has a number-average molecular weight, $M_n$, of 4000 or less. Preferably, the molecular weight is from 1250 to 3000, and more preferably, from 1300 to 2500. Additionally, the resin composition of the subject invention has a non-volatile content of from 50 to 90, preferably from 60 to 75, percent non-volatile by weight. The resin composition also has a polydispersity of 1 to 2 and preferably from about 1.01 to 1.5.

The coating composition also includes the first cross-linking agent. More specifically, the coating composition incorporates the polyester resin composition of either the first or the second embodiment with the first cross-linking agent. The first cross-linking agent is reactive with at least one of the primary carbamate group and/or the silylalkoxy group. The first cross-linking agent has at least one of an alkoxy group, an amine group, and a hydroxyl group reactive with at least one of the primary carbamate group and/or the silylalkoxy group of the polyester resin composition.

In an alternate embodiment, the coating composition further includes a cross-linkable resin that is different than the first cross-linking agent to achieve the secondary cross-linking. The cross-linkable resin is not intended to be limited to resin understood by those skilled in the art and may include compounds that are not resins. If included, the cross-linkable resin has at least one of an alkoxy group, an amine group, and a hydroxyl group reactive with the primary carbamate group and the silylalkoxy group. The selection of the first cross-linking agent and the cross-linkable resin is important to ensure that the cross-linking agents do not react with the same molecule, which is referred to as "back-biting" that terminates the cross-linking capabilities. For the cross-linking to occur, the first cross-linking agent and the cross-linkable resin should have a sufficient molecular weight to ensure that the back-biting is reduced. Those skilled in the art of coatings know that if the cross-linking sites on the resin and the cross-linker can form a 5–8 member ring, back-biting is favored (two sites from the cross-linker reacting with two sites on the same polymer chain, which does not promote curing to give infinite molecular weight coating with needed properties. For example, in the alkoxysilyl cross-linker, the crosslinking sites are made up of three atoms (O—Si—O), and if the resin has hydroxyl groups separated by only three to five atoms, will most probably suffer a back-biting cross-linking, resulting in lose of properties.

In a preferred embodiment, the first cross-linking agent has an alkoxy group reactive with the primary carbamate group and the cross-linkable resin has at least one of an amine group and a hydroxyl group reactive with the silylalkoxy group. The first cross-linking agent is most preferably an aminoplast resin having alkoxy groups. Preferably, this first cross-linking agent is an aminoplast resin that is reactive with the primary carbamate groups. The aminoplast resin is the reaction product of a formaldehyde and an amine selected from the group of ureas, melamines, and combinations thereof. Melamine and urea are the preferred amines, but other amines may be used including, but not limited to, triazines, triazoles, diazines, guanidines, or guanamines. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that have one to six carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. The amine may be further mixed with a blocked isocyanate to prepare the aminoplast resin. The preferred first cross-linking agent is RESIMENE® 747, commercially available from Solutia. The first cross-linking agent is present in an amount of from 1 to 30 parts by weight based on 100 parts by weight of the coating composition, preferably from 1 to 25, and more preferably from 5 to 15.

The cross-linkable resin is most preferably selected from the group of a diol, a triol, a polyamine, a carbamate, an alkanolamine, and combinations thereof. However, it is to be appreciated that those skilled in the art will recognize other cross-linking agents having functional groups capable of cross-linking with either the primary carbamate groups and the silylalkoxy groups. For example, the first cross-linking agent may include both the alkoxy groups and at least one of an amine group and a hydroxyl group, such that the first cross-linking agent reacts with both the primary carbamate group and the silylalkoxy group. In the preferred embodiment, the cross-linkable resin is a specialized formulation including a resin component and a non-resin component. The resin component includes the functional groups capable of cross-linking with either the primary carbamate groups and the silylalkoxy groups. The non-resin component may include additives, such as fumed silica as a filler, and additional solvent. However, it is to be appreciated that other resin may be used as the cross-linkable resin than as specifically described. When referring to the amount of cross-linkable resin, those skilled in the art will appreciate that the amount refers to the resin component. The resin component of the cross-linkable resin is present in an amount of from 1 to 16 parts by weight based on 100 parts by weight of the coating composition, preferably from 1 to 12, and more preferably from 1 to 8.

The coating composition may also include at least one additive. The additive is selected from the group consisting of surfactants, flow and appearance control agents, defoaming agents, fillers, stabilizers and pigments. Of course, combinations of the above-referenced additives are suitable for the coating composition. The surfactants reduce the surface tension of the coating composition. Examples of suitable surfactants include BYK 345, available from Chemie, and Disparlon EXQ 200P. The flow control agents increase the sprayability of the coating composition, while the appearance control agents improve the final appearance of the coating composition. The defoaming agents improve the appearance of the coating composition by destabilizing the surface films of bubbles. The defoaming agent may also spread on the surface of these films as the bubbles form thereby breaking the bubbles. A suitable defoaming agent is Surfynol DF-37 available from Air Products Chemical. Rheology control agents may also be used to control the flow the coating composition. One suitable product may be obtained from KIA Inc., under the tradename Acrysol RM-12W.

The coating composition may further include at least one catalyst. Preferably, the catalyst is an acidic catalyst. Acidic catalysts are used to modify the cure, i.e., the reaction, of the polyester resin composition with the cross-linking agents. The acidic catalyst either: (1) lowers the temperature required for the reaction between the polyester resin composition and the cross-linking agents; or (2) raises the reaction rate of the reaction between the polyester resin composition and the cross-linking agents, or both. The acidic catalyst may be blocked with an amine or other suitable blocking agent such as an oxirane modifying material. The amine, which is volatile, is a suitable blocking agent because the volatile amine 'escapes' from the coating composition as the coating composition cures thereby unblocking the acidic catalyst due to heat introduced by any conventional means, such as an oven, during cure. A suitable unblocked acid catalyst for use in the coating composition of the subject invention is sold by King Industries under the trademark and number NACURE® 5225.

For automotive applications, the coating composition of the invention are preferably applied by spray coating. The clear coat may be sprayed over various basecoats. One such basecoat may include pigmented/metallic flakes dispersed through the basecoat. Such applications of the clear coat may be applied with or without flashes in between, when the basecoat is applied over primers etc. Coating layers of one mil or more are typically applied in two or more coats, separated by a time sufficient to allow some of the solvent or aqueous medium to evaporate, or "flash," from the applied layer. The flash may be at ambient or elevated temperatures, for example, the flash may use radiant heat. The layers described are preferably cured with heat. Curing temperatures are from 120° C. to 150° C., preferably from 125° C. to 140° C., and most preferably from 132° C. to 138° C. Typical curing times at these temperatures range from 15 to 45 minutes, and preferably the temperature is chosen to allow a cure time of from 20 to 40 minutes, and most preferably from 25 to 30 minutes.

It is to be understood that all of the preceding chemical representations are merely two-dimensional chemical representations and that the structure of these chemical representations may be other than as indicated. Further, the intermediates illustrated are but one of many different intermediates that may result and the invention is not necessarily limited to the reactions with such intermediates. The following examples illustrate the formation of the resin composition of the subject invention, as presented herein, and are intended to illustrate and not limit the subject invention.

EXAMPLES

Examples 1 through 4 and the Control illustrate the formation of the resin composition according to the subject invention for use in a coating composition. Each of the Examples is formed according to the second embodiment for forming the polyester resin composition as described above. It is to be appreciated that the first embodiment would likely produce a paint film with similar improved scratch and mar characteristics. The resin composition was prepared by adding and reacting the following parts listed in Tables 1–3 as indicated.

TABLE 1

| Component | Example 1 Amt (grms) | Example 1 Wgt % | Example 2 Amt (grms) | Example 2 Wgt % | Example 3 Amt (grms) | Example 3 Wgt % | Example 4 Amt (grms) | Example 4 Wgt % | Control Amt (grms) | Control Wgt % |
|---|---|---|---|---|---|---|---|---|---|---|
| First Component | 63.6 | 6.8 | 136.0 | 8.7 | 52.1 | 6.6 | 74.8 | 7.2 | 136.0 | 7.8 |
| Carboxylic Acid Anhydride | 237.7 | 25.5 | 508.2 | 32.5 | 194.6 | 24.6 | 279.5 | 26.9 | 508.2 | 29.3 |
| Second Compound | 382.7 | 41.0 | 818.4 | 52.3 | 313.3 | 39.5 | 450.1 | 43.4 | 818.4 | 47.2 |
| Carbamate Compound | 165 | 17.7 | 255.0 | 16.3 | 57.4 | 7.2 | 132 | 12.7 | 270.0 | 15.6 |
| Silyl Compound B | — | — | 103.0 | — | 175 | 22.1 | 101 | 9.7 | 0.0 | 0.0 |
| Silyl Compound A | 84 | 9.0 | — | 6.6 | — | — | — | — | 0.0 | 0.0 |
| TOTAL | 933 | 100.0 | 1565 | 100.0 | 762.4 | 100.0 | 1037.4 | 100.0 | 1732.6 | 100.0 |

The first compound is pentaerythritol (PE), the carboxylic acid anhydride is hexahydrophthalic anhydride (HHPA), and the second compound is glycidylneodecanoate, commercially available as CARDURA E 10P. The carbamate compound is methyl carbamate. Silyl compound A is 3-isocyanatopropyltriethoxysilane and silyl compound B is 3-isocyanatopropyltrimethoxysilane, commercially available from Crompton Corp. as SILQUEST® A-Link 25 or SILQUEST® A-Link 35, respectively.

In each of the above Examples, the HHPA was added in a reaction flask to the PE, i.e., the branched compound, to form the first intermediate compound. The reaction flask, including the solvent xylene, PE and HHPA, was heated with a conventional heat supply to 125° C. An exotherm was observed which was kept below 145° C. and after this exotherm, the batch was held at 137–138° C. till standard titration for acid number revealed that the reaction to form the first intermediate compound was complete. The completeness of the reaction between the PE and HHPA was also monitored with IR Spectroscopy noting the absence of an anhydride peak.

Next, the reaction mixture was cooled and CARDURA E 10P was added to the first intermediate compound to form a second intermediate compound. Another exotherm was observed which was controlled to be below 138° C. and the reaction was maintained at 137° C. until standard titration for acid number revealed that the reaction to form the second intermediate compound was complete (<3 mg KOH/gram). The completeness of this reaction was also monitored with IR Spectroscopy noting the absence of an epoxide peak. The second intermediate compound had a hydroxyl number of about 160 to 170 mg KOH/gram/solids.

Next, the second intermediate compound was then reacted with the carbamate compound to form a carbamated intermediary. The methyl carbamate is mixed with a catalyst, dibutyl tin oxide (DBTO), in toluene prior to adding to the second intermediate compound. The mixture was heated with a conventional heat supply to 120–125° C., such that carbamation took place with the azeotropic removal of methanol as the side product. When titration for hydroxyl number indicated the desired level of trans-carbamation, excess methyl carbamate was removed by vacuum distillation. The following table represent the amount of trans-carbamation based on the hydroxyl number after each stage of the reactions, acid number, and % trans-carbamated, as indicated. Stage 1 represents the reaction between the PE and HHPA. Stage 2 represents the reaction between stage 1 and Cadura E10. Stage 3 is the reaction between stage 2 and methyl carbamate. Stage 4 is the reaction between stage 3 and amount of hydroxyl groups reacted with silyl compound.

TABLE 2

Properties at Various Stages of the Reaction

| | Example 1 | Example 2 | Example 3 | Example 4 | Control |
|---|---|---|---|---|---|
| Stage 1 | | | | | |
| OH No., mg KOH/g/NV | 258 | 290 | 284 | 284 | 270 |
| Stage 2 | | | | | |
| Acid No., mg KOH/g/NV | 2.7 | 2.6 | 3.1 | 3.1 | 3.4 |
| OH No., mg KOH/g/NV | 164 | 168 | 163.2 | 163.2 | 164 |
| Stage 3 | | | | | |
| OH No., mg KOH/g/NV | 25.6 | 26.2 | 33.3 | 85.4 | 17.4 |
| % Trans-carbamation | 85% | 84.4% | 80% | 48% | 89.4% |
| Stage 4 | | | | | |
| % OH Reacted with Silyl Compound | 15% | 15% | 20% | 50% | 0% |

The Control was not further mixed with either one of the silyl compound A or B. For Examples 1–4, the carbamated intermediary was then mixed with the silyl compound to form the resin composition. The silyl compound was added to the reaction flask of the carbamated intermediary. The reaction flask was heated and the reaction was continued until all of the isocyanate groups present from the silyl compound have reacted with the hydroxyl groups of the carbamated intermediary. In Example 1, the resultant resin composition had 0% isocyanate groups, a non-volatile content of 71%, and an equivalent weight of 470 g/carbamate and 888 g/ethoxy (from triethoxysilyl group). The resultant resin composition has a measured weight-average molecular weight of 2115 and a poly-dispersity of 1.6. In Example 2, the resultant resin composition had 0% isocyanate groups, a non-volatile content of 69.7%, and an equivalent weight of 468 g/carbamate and 884 g/methoxy (from trimethoxysilyl group). The resultant resin composition has a measured weight-average molecular weight of 1840 and a poly-dispersity of 1.03. In Example 3, the resultant resin composition had 0% isocyanate groups, a non-volatile content of 80.8%, and an equivalent weight of 580 g/carbamate and 777 g/methoxy (from trimethoxysilyl group). The resultant resin composition has a measured weight-average molecular weight of 1830 and a poly-dispersity of from 1.03. In Example 4, the resultant resin composition had 0% isocyanate groups, a non-volatile content of 79.4%, and an equivalent weight of 1008 g/carbamate and 336 g/methoxy (from trimethoxysilyl group). The resultant resin composition has a measured weight-average molecular weight of 1970 and a poly-dispersity of from 1.04. All these resins show self cross-linking when heated to 110° C. (temperature at which % NV was measured).

The polyester resin compositions having the increased cross-linking capability of Examples 1–4 and the resin composition of the Control were then blended with cross-linking agents to form a coating composition as set forth in Table 3 below. The coating compositions were applied to a substrate, the body panel of a vehicle, to produce a paint film. In each of the examples, the components are listed as amount in grams added to form the coating composition. Additionally, the weight percent for each of the components is listed. The paint film has improved scratch and mar characteristics as will be discussed further below.

In each of the above examples, the coating composition was prepared as indicated in Table 2. Then, the coating compositions were applied, via air-atomized spray gun, wet-on-wet over a conventional, black water-based basecoat, ColorBrite® HC which is available from BASF Automotive Coatings, Southfield, Mich. The basecoat was sprayed over 4×12 inch electrocoated steel panels, which are representative of body panels of a vehicle. The basecoat was flashed for 5 minutes at 140 degrees F. before the coating composition of the subject invention was applied. The basecoat film build was about 0.7 mil (18 microns) and the coating composition film build was about 1.8–2.0 mil (46–51 microns). After application, the panels were allowed to flash at ambient temperature for 10 minutes and then cured in a gas fired convection oven for 20 minutes at 275 degrees F., metal temperature.

The prepared panels were then tested for gloss and for scratch and mar characteristics. A number of test methods and apparatus set-ups have been used to attempt to duplicate and test the scratch and mar resistance of automotive coatings. The Crockmeter method used determines the initial gloss of each coated panel at three points using a Byk-Gardner 20 degree Micro-gloss meter. The panel was then

TABLE 2

| Component | Example 1 Amt (grms) | Example 1 Wght % | Example 2 Amt (grms) | Example 2 Wght % | Example 3 Amt (grms) | Example 3 Wght % | Example 4 Amt (grms) | Example 4 Wght % | Control Amt (grms) | Control Wght % |
|---|---|---|---|---|---|---|---|---|---|---|
| Polyester Resin Composition | 106.8 | 71.4 | 108.8 | 71.8 | 102.1 | 73.2 | 96.4 | 70.3 | 102.0 | 69.8 |
| First Cross-linking Agent | 12.2 | 8.2 | 12.2 | 8.1 | 6.9 | 4.9 | 10.1 | 7.4 | 13.6 | 9.3 |
| Cross-Linkable Resin | | | | | | | | | | |
| Resin Component | 5.8 | 3.9 | 5.8 | 3.8 | 5.8 | 4.1 | 5.8 | 4.2 | 5.8 | 4.0 |
| Non-resin Component | 14.5 | 9.7 | 14.5 | 9.5 | 14.5 | 10.4 | 14.5 | 10.6 | 14.5 | 9.9 |
| Stabilizer A | 3.2 | 2.1 | 3.2 | 2.1 | 3.2 | 2.3 | 3.2 | 2.3 | 3.2 | 2.2 |
| Stabilizer B | 1.5 | 1.0 | 1.5 | 1.0 | 1.5 | 1.1 | 1.5 | 1.1 | 1.5 | 1.0 |
| Flow Modifier | 0.8 | 0.5 | 0.8 | 0.5 | 0.8 | 0.6 | 0.8 | 0.6 | 0.8 | 0.5 |
| Catalyst | 4.8 | 3.2 | 4.8 | 3.2 | 4.8 | 3.4 | 4.8 | 3.5 | 4.8 | 3.3 |
| TOTAL | 149.5 | 100.0 | 151.5 | 100.0 | 139.5 | 100.0 | 137.0 | 100.0 | 146.1 | 100.0 |

The first cross-linking agent is RESIMENE® 747, commercially available from Solutia. RESIMENE® 747 is an etherified low molecular weight methylated melamine. More specifically, it is primarily hexamethoxymethyl melamine having both alkoxy groups and amines groups available for cross-linking. The cross-linkable resin has a resin component which is an acrylic based resin having 60% carbamate groups and 40% hydroxyl groups, both of which are available for cross-linking. The acrylic based resin is present in an amount of about 29 parts by weight based on 100 parts by weight of the cross-linkable resin and has a molecular weight of about 4000. The non-resin component of the cross-linkable resin includes a fumed silica and additional solvent. The fumed silica is present in an amount of about 10 parts by weight based on 100 parts of the cross-linkable resin. Stabilizer A is TINUVIN® 384B UVA, which is an ultra-violet absorber and Stabilizer B is TINUVIN® 123 HALS, which is a hindered amine light stabilizer, which are both commercially available from Ciba-Geigy. The flow modifier is Lindron 22, which is a polybutyl acrylate rheology control agent additive that is commercially available from Lindau Chemicals. The catalyst is NACURE® 5225, commercially available from King Industries.

marred at these points using the mechanically driven CM-1 Crockmeter from Atlas Electric Devices Co. equipped with 3M 281Q polishing paper for 10 double cycles. The final gloss of each mar was then determined and the average gloss retention for the three points was calculated. Table 3 sets forth the results for each of the above examples.

TABLE 3

| | Example 1 | Example 2 | Example 3 | Example 4 | Control |
|---|---|---|---|---|---|
| Viscosity | 92.2 | 96.8 | 90.1 | 102.9 | 101.4 |
| NV Wt % | 60.0 | 60.0 | 60.8 | 62.3 | 60.8 |
| Initial Gloss | 87.8 | 87.4 | 87.7 | 88.0 | 88.0 |
| % Gloss Retention | 92.6 | 90.0 | 93.9 | 95.8 | 91.8 |

An average of 90% gloss retention is rated good and a gloss retention of 95% is rated excellent, and has been shown to fairly accurately predict the performance of an OEM automotive finish in field usage. The Control, which did not include any silyl compound, produced a percent gloss retention of 91.8, just slightly above good. This was primarily due to the fact that the resin composition includes unreacted hydroxyls that may be used as only a single site for cross-linking.

Each of Examples 1–4 produced a percent gloss retention having a rating of at least good. Example 1 produced the film having an improved percent gloss rating by about 1% compared to the Control. Example 3 produced the film having an improved percent gloss rating by about 2.3% compared to the Control. Example 4 produced the film having an excellent rating and having an improved percent gloss rating by about 4.3% compared to the Control. The improved percent gloss retention is a result of additional cross-linking between the first cross-linking agent with primary carbamate groups of the resin composition and the cross-linkable resin with the silylalkoxy groups of the resin composition. The polyester resin composition has primary carbamate groups that act initially as a cross-linkee and the first cross-linking agent is a cross-linker. The silyl compounds of the polyester resin composition act as a cross-linker and the resin component of the cross-linkable resin acts as a cross-linkee. Further, the silyl compound provides the three additional silylalkoxy groups for secondary cross-linking, whereas the Control only had available an unreacted hydroxyl group for cross-linking. Therefore, it is believed that Examples 1–4 have increased cross-linking which improves the scratch and mar characteristics of the film.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A coating composition comprising:
   a polyester resin composition having increased cross-linking capability comprising the reaction product of;
   a first compound having a plurality of hydroxyl groups,
   a carbamate compound reactive with said hydroxyl groups of said first compound and added in an amount sufficient to form a carbamated intermediary having at least one primary carbamate group available for cross-linking and having unreacted hydroxyl groups, and
   a silyl compound having a terminal isocyanate group reactive with said unreacted hydroxyl groups of said carbamated intermediary and having at least one silylalkoxy group that is available for secondary cross-linking after said terminal isocyanate group reacts with said unreacted hydroxyl groups, and
   a first cross-linking agent reactive with at least one of said primary carbamate group and said silylalkoxy group.

2. A coating composition as set forth in claim 1 wherein said first cross-linking agent has at least one of an alkoxy group, an amine group, and a hydroxyl group reactive with at least one of said primary carbamate group and said silylalkoxy group.

3. A coating composition as set forth in claim 2 further comprising a cross-linkable resin different than said first cross-linking agent and having at least one of an alkoxy group, an amine group, and a hydroxyl group reactive wit said primary carbamate group and said silylalkoxy group.

4. A coating composition as set forth in claim 1 wherein said first cross-linking agent has an alkoxy group reactive with said primary carbamate group.

5. A coating composition as set forth in claim 4 further comprising a cross-linkable resin different than said first cross-linking agent and having at least one of an amine group and a hydroxyl group reactive with said silylalkoxy group.

6. A coating composition as set forth in claim 5 wherein said first cross-linking agent is further defined as an aminoplast resin having alkoxy groups.

7. A coating composition as set forth in claim 6 wherein said aminoplast resin is the reaction product of a formaldehyde and an amine selected from the group of ureas, monomeric melamines, polymeric melamines, and combinations thereof.

8. A coating composition as set forth in claim 7 further comprising a blocked isocyanate mixed with said amine.

9. A coating composition as set forth in claim 6 wherein said cross-linkable resin is selected from the group of a diol, a triol, a carbamate, a polyamine, an alkanolamine, amine, carbamate and combinations thereof.

10. A coating composition as set forth in claim 1 wherein said first cross-Linking agent has an alkoxy group reactive with said primary carbamate group and at least one of an amine group and a hydroxyl group reactive with said silylalkoxy group.

11. A coating composition as set forth in claim 1 wherein said silyl compound is further defined as an isocyanatosilylalkoxysilane.

12. A coating composition as set forth in claim 1 wherein said first compound is selected from the group of erythritol, pentaerythritol, dipentaerythritol, glycerol, trimethylolethane, trimethylolpropane, dulcitol, threitol, and combinations thereof.

13. A coating composition as set forth in claim 1 wherein said carbamate compound is further defined as an alkyl carbamate having 1 to 20 carbon atoms in the alkyl chain.

14. A coating composition as set forth in claim 1 wherein said silyl compound is selected from the group of isocyanatopropyltrimethoxysilane, isocyanate-propylmethyldimethoxysilane, isocyanatopropylmethyldiethoxysilane, isocyanatopropyl-triethoxysilane, isocyanatoneohexyltrimethoxysilane, isocyanateneohexyldi-methoxysilane, isocyanatoneohexydiethoxysilane, isocyanatoneohexyltriethoxysilane, isocyanatoisoamyltrimethoxysilane, isocyanatoisoamyldimethoxysilane, isocyanateiso-amylmethyldiethoxysilane, isocyanatoisoamyltri-ethoxysilane, and combinations thereof.

15. A coating composition as set forth in claim 1 wherein said polyester resin composition has a polydispersity of from 1 to 2.

16. A coating composition as set forth in claim 1 wherein said polyester resin composition has a number-average molecular weight of less than 4000.

17. A coating composition as set forth in claim 1 wherein said polyester resin composition has a non-volatile content of from 50 to 90.

18. A coating composition as set forth in claim 1 wherein said polyester resin composition further comprises the reaction product of a carboxylic acid anhydride reactive with said hydroxyl groups of said first compound.

19. A coating composition as set forth in claim 18 wherein said polyester resin composition further comprises a second compound having at least one epoxy group reactive with said carboxylic acid anhydride groups.

20. A coating composition comprising:
    a polyester resin composition having increased cross-linking capability comprising the reaction product of;
    a first compound having a plurality of hydroxyl groups,
    a carboxylic acid anhydride reactive with said hydroxyl groups of said first compound and added in an amount sufficient to form a first intermediate compound having at least one carboxylic acid group and unreacted hydroxyl groups, a second compound having at least one epoxy group reactive with said carboxylic acid group to form a second intermediate compound having unreacted hydroxyl groups, a carbamate compound forming at least one primary carbamate group reactive with said unreacted hydroxyl groups of said second intermediate compound to form a carbamated intermediary having at least one primary carbamate group available for cross-linking and having unreacted hydroxyl groups, and a silyl compound having a terminal group reactive with said unreacted hydroxyl groups and having at least one silylalkoxy group that is available for secondary cross-linking after said terminal group reacts with said unreacted hydroxyl groups; and a first cross-linking agent reactive with at least one of said primary carbamate group and said silylalkoxy group.

21. A coating composition as set forth in claim 20 wherein said first cross-linking agent has at least one of an alkoxy group, an amine group, and a hydroxyl group reactive with at least one of said primary carbamate group and said silylalkoxy group.

22. A coating composition as set forth in claim 21 further comprising a cross-linkable resin different than said first cross-linking agent and having at least one of an alkoxy group, an amine group, and a hydroxyl group reactive with said primary carbamate group and said silylalkoxy group.

23. A coating composition as set forth in claim 20 wherein said first cross-linking agent has an alkoxy group reactive with said primary carbamate group.

24. A coating composition as set forth in claim 23 further comprising a cross-linkable resin different than said first cross-linking agent and having at least one of an amine group and a hydroxyl group reactive with said silylalkoxy group.

25. A coating composition as set forth in claim 20 wherein said first compound is selected from the group of erythritol, pentaerythritol, dipentaerythritol, glycerol, trimethylolethane, trimethylolpropane, dulcitol, threitol, and combinations thereof.

26. A coating composition as set forth in claim 20 wherein said second compound is selected from the group of glycidylneodecanoate, dodecyl oxide, tetradecyl oxide, octadecyl oxide, and cyclohexene oxide, and combinations thereof.

27. A coating composition as set forth in claim 20 wherein said carboxylic acid anhydride is selected from the group of maleic anhydride, hexahydrophthalic anhydride, methylhexahydrophthalic anhydride, tetrahydrophthalic anhydride, phthalic anhydride, succinic anhydride, dodecenylsuccinic anhydride, trimellitic anhydride, and combinations thereof.

28. A coating composition as set forth in claim 20 wherein said carbamate compound is further defined as an alkyl carbamate having 1 to 20 carbon atoms in the alkyl chain.

29. A coating composition as set forth in claim 20 wherein said carbamate compound is selected from the group of methyl carbamate, ethyl carbamate, and combinations thereof.

30. A coating composition as set forth in claim 20 wherein said silyl compound is selected from the group or isocyanatopropyltrimethoxysilane, isocyanatepropylmethyldimethoxysilane, isocyanatopropylmethyldiethoxysilane, isocyanatepropyltriethoxysilane, isocyanatoneohexyltrimethoxysilane, isocyanateneohexyldimethoxysilane, isocyanatoneohexydiethoxysilane, isocyanatoneohexyltriethoxysilane, isocyanateisoamyltrimethoxysilane, isocyanatoisoamyldimethoxysilane, isocyanatoisoamylmethyldiethoxysilane, isocyanatoisoamyltriethoxysilane, and combinations thereof.

31. A coating composition as set forth in claim 20 wherein said polyester resin composition has a polydispersity of from 1 to 2.

32. A coating composition as set forth in claim 20 wherein said polyester resin composition has a number average molecular weight of less than 4000.

33. A coating composition as set forth in claim 20 wherein said polyester resin composition has a non-volatile content of from 50 to 90.

34. A substrate including a paint film having improved scratch and mar characteristics, said substrate comprising:
a substrate having a surface;
a coating composition applied to said surface of said substrate to form a paint film;
said coating composition comprising a polyester resin composition having increased cross-linking capability comprising the reaction product of;
a first compound having a plurality of hydroxyl groups,
a carbamate compound reactive with said hydroxyl groups of said first compound and added in an amount sufficient to form a carbamated intermediary having at least one primary carbamate group available for cross-linking and having unreacted hydroxyl groups, and
a silyl compound having a terminal isocyanate group reactive with said unreacted hydroxyl groups of said carbamated intermediary and having at least one silylalkoxy group that is available for secondary cross-linking after said terminal isocyanate group reacts with said unreacted hydroxyl groups; and
a first cross-linking agent reactive with at least one of said primary carbamate group and said silylalkoxy group.

35. A substrate as set forth in claim 34 wherein said first cross-linking agent has an alkoxy group reactive with said primary carbamate group.

36. A substrate as set forth in claim 35 further comprising a cross-linkable resin different than said first cross-linking agent and having at least one of an amine group and a hydroxyl group reactive with said silylalkoxy group.

37. A substrate as set forth in claim 36 wherein said first cross-linking agent is further defined as an aminoplast resin having alkoxy groups.

38. A substrate as set forth in claim 37 wherein said cross-linkable resin is selected from the group of a diol, a triol, a carbamate, a polyamine, an alkanolamine, and combinations thereof.

39. A substrate as set forth in claim 34 wherein said paint film has a gloss of from 70 to 90.

40. A substrate as set forth in claim 34 wherein said paint film has an improved gloss retention of from 0.5% to 10%.

41. A substrate as set forth in claim 34 wherein said substrate is further defined as a body panel for a vehicle.

* * * * *